3,223,535
PACKAGE HAVING NON-COCKLING
FOOD WRAPPER
Charles M. Rosser, Wallingford, Pa., assignor, by mesne assignments, to FMC Corporation, San Jose, Calif., a corporation of Delaware
No Drawing. Filed Nov. 19, 1962, Ser. No. 238,745
3 Claims. (Cl. 99—171)

The invention relates to moistureproof sheet wrapping material, and particularly to a package having a non-cockling, heat-sealable and moistureproof cellulosic wrapper.

Coated films suitable for wrapping moisture-containing food articles, as for example bread, are required to be heat-sealable, minimize the loss of moisture from the wrapped articles, and provide for neat and attractive packages. Regenerated cellulose films employed for this purpose are generally formed by coating opposite sides thereof with a nitrocellulose composition containing a moistureproofing wax. Such coated films are heat-sealable and moistureproof but become cockled; that is, develop a puckered or wrinkled appearance caused by the unequal contraction and/or expansion of the film in the presence of moisture from cake, bread or other moist food.

It is an object of this invention to overcome the aforementioned difficulties and disadvantages and provide coated cellulosic films which exhibit improved cockle resistance while maintaining good moistureproofness and heat-seal strength. A more specific object of the invention is to produce nitrocellulose coated regenerated cellulose films which are non-cockling, heat-sealable, and moistureproof. Other objects and advantages of the present invention will be obvious from the following detailed description.

From the standpoint of simplicity and ease of description, the invention is hereafter described as it is applicable to regenerated cellulose film or cellophane. It will be understood, however, that such description is merely illustrative and that invention is also applicable to hydroxyalkyl cellulose ether films including hydroxyethyl and hydroxypropyl ethers.

The objects of the present invention are achieved by coating one side of a base-regenerated cellulose film with a moistureproof nitrocellulose composition while its opposite side is coated with a similar nitrocellulose composition which is heat-sealable but contains no moistureproofing agent. When applied to a moist food article with its moistureproof side toward the article, the coated regenerated cellulose film of the present invention exhibits far less and much finer cockling than conventional films. On the other hand, when applied with its moistureproof side away from the moist food article no cockling of the film is apparent.

Moistureproof nitrocellulose coatings of known compositions are suitable for use in the present invention. Broadly, such conventional coatings may include, in parts by weight of the total and exclusive of solvents, from about 30% to 70% nitrocellulose, 10% to 60% plasticizers, 1 to 20% of resins or blending materials, and as much as 10% wax or mixtures of waxes. The components of the nitrocellulose coatings mentioned above are to be considered illustrative since other components may be incorporated to impart other necessary or desirable properties to the coated film. The coating may also include slip and antiblocking agents, for example, bentonite, talc, kaolinite or ZnO.

The nitrocellulose serves to provide a film or continuous layer and, as mentioned above, may comprise from about 30% to 70% of the total solids. Approximately 55% is a convenient and generally useful proportion, and in most instances the range of 45% to 70% will be found satisfactory. The ratio of nitrocellulose to blending materials may vary over a wide range, say for example, 2:1 to 10:1 (or even greater), but for most purposes a ratio of 3:1 to 9:1 is satisfactory. A ratio of 4:1 is convenient, and generally yields good results.

The nitrocellulose content is usually in excess of the total plasticizer content, and the ratio of nitrocellulose to plasticizer may vary from 1:1 to 6:1, but a ratio of 1.5:1 to 4:1 has generally been found to give the best results.

The total plasticizer concentration may vary through a wide range of from 10% to 60% of the total solids. Low percentages of plasticizer, however, are usually used only when the blending material is capable of exhibiting a plasticizing action and therefore substitutes for a portion of the plasticizer which might otherwise be added.

Suitable plasticizers, which can be used alone or in combination with each other, include cibutyl phthalate, dilauryl phthalate, cyclohexyl butyl phthalate, di(methylcyclohexyl)phthalate, di(methylcyclohexyl) adipate, dicyclohexyl adipate, phthalimido ethyl propionate, trialkyl citrates, acetylated trialkyl citrates, esters of o-benzoyl benzoic acid such as butyl benzoyl benzoate, derivatives of toluene sulfonamide, or the like, p-toluene sulfon ethylamide, etc.

The blending materials are particularly important in the formation of a moistureproof nitrocellulose coating in that they serve to improve the compatibility of the ingredients of the composition. While not essential, the blending materials may be resinous in nature, whereby advantage being taken of its film-forming characteristics by adding a quantity sufficient to contribute towards the body and build of the coating composition in addition to its blending action.

The blending materials may vary with the plasticizer and moistureproofing agent employed. The ratio of blending materials to moistureproofing agents may vary from 1:5 or less to 5:1 or more. Usually a ratio of approximately 3:1 or 4:1 will be found satisfactory. Larger amounts of blending materials are usually used when the blending materials exert some plasticizing action, and can therefore replace a portion of the plasticizer.

As the blending materials, any of the natural or synthetic resins commonly available may be used so long as they are compatible and form homogeneous mixtures. Such resins may include ester gum, rosinates, hydrogenated rosin, hydrogenated rosin esters, dammar, copal, kauri, alkyl resins, vinyl derivatives, chlorinated diphenyl resins and soluble resins of the phenol-formaldehyde type. Non-resinous blending materials may be used when they yield homogeneous mixtures, and these may include hydrogenated castor oil, castor oil phthalate, lanolin or wool grease, ethyl abietate, methyl abietate, diethyl glycol rosinate, diethylene glycol hydrorosinate, or the like.

The moistureproofing agent is usually present in a quantity sufficient to impart a suitable degree of moistureproofness while still maintaining homogeneity of composition so that the ultimate moistureproofing coating will be clear, transparent, non-greasy, non-smeary and non-tacky under normal conditions of handling and storage.

Generally speaking, if the moistureproofing agent constitutes less than about 10% of the total solids, these conditions will be fulfilled. While 2% to 6% of the moistureproofing agent has been found to yield excellent results, more or less may be used, depending upon the nature of the moistureproofing agent or the degree of moistureproofness desired.

Suitable moistureproofing agents include waxes or waxlike materials, for example, paraffin, petrolatum,, ceresin, Japan wax, palm wax, beeswax, certain chlorinated hydrocarbons, Chinese insect wax, or other synthetic waxes or wax-like materials. If some of the waxes are too soft for the purpose desired, they may be mixed with harder waxes of the groups or with carnauba wax or candelilla wax.

The heat-sealable but non-moistureproof nitrocellulose coatings employed in the present invention may also be known compositions. Such coatings may contain, by weight and exclusive of solvents, from about 30% to 75% nitrocellulose, from 25% to 70% plasticizer and from about 2% to 10% resin or blending material to insure good adhesion.

The above-described coating compositions are prepared for application by being dissolved in one or a combination of solvents which are readily volatile and which will retain the solid coating ingredients in a homogeneous solution until all solvents are evaporated. The particular solvents and the amount of solvents used depend upon such factors as the desired viscosity of the coating compositions, the thickness of the coating to be applied, the nature and quantities of the solid ingredients and the method of application. Suitable solvents include toluene, Cellosolve, butyl acetate, ethyl acetate, acetone, ethanol, methanol, butyl alcohol, methyl ethyl ketone, heptane, etc.

The coating compositions may be applied simultaneously to the opposite sides of a dry and conditioned regenerated cellulose film or in two separate stages or passes by any of the methods known in the art.

If desired, an anchor coating may be applied to either or both sides of the base regenerated cellulose film. Such anchor coatings are well known in the art and include phenol formaldehyde resins, urea formaldehyde resins, melamine formaldehyde resins, polyethylene imine having a degree of polymerization above 50, etc. In view of the relatively low melting point of the wax or waxes employed, the moistureproof coating composition is preferably applied to one side of the film after coating of the opposite side thereof with the heat-sealable but non-moistureproof nitrocellulose coating is completed. The moistureproof coating is dried preferably with warm air which is maintained at a temperature above the melting point of the contained wax ingredients to thereby prevent separation or crystallization of the wax during the drying operation. The coated and now dry regenerated cellulose film is then cooled and collected.

The coated regenerated cellulose film of the present invention may be employed for wrapping moisture-containing articles of food using conventional equipment and wrapping procedures. Improved cockle resistance is exhibited by the resulting film regardless of whether its moistureproof surface is positioned toward or away from the moisture-containing article being wrapped.

To illustrate and more fully describe the invention, the following example is provided.

Lacquers or coating compositions were prepared employing the following formulations:

| | Parts | |
|---|---|---|
| | No. 1 | No. 2 |
| Nitrocellulose | 53 | 50 |
| Dibutyl phthalate | 37 | 35 |
| Gum dammar | 10 | 11 |
| Paraffin | | 4 |

Composition No. 1 was dissolved in a solvent mixture consisting of 475 parts ethyl acetate, 235 parts toluene and 20 parts ethyl alcohol, applied to only one side of a dry and conditioned regenerated cellulose film, and then dried. The opposite surface of the regenerated cellulose was then coated with composition No. 2 which was also dissolved in a solvent mixture as described above. Once applied, this coating was also dried and the coated film cooled.

Sliced French (white) bread was wrapped in the above described coated film using conventional wrapping equipment. Wrapped bread samples were prepared in which the moistureproofed surface of the coated film was directed toward the bread, while in other samples such surface was directed away from the wrapped bread.

For purposes of comparison, a conventional regenerated cellulose film having a moistureproof coating on both sides was prepared using composition No. 2 and was then employed in wrapping sliced French (white) bread as described above.

All of the wrapped bread samples exhibited good heat-sealing properties. Other characteristics of the different samples were as follows:

| Sample | Appearance After 48 Hours | Moisture Loss in 48 Hours |
|---|---|---|
| Film with moistureproof coating toward bread. | Very slight amount of fine cockling. | Acceptable. |
| Film with moistureproof coating away from bread. | No cockling observed. | Do. |
| Film with moistureproof coating on both sides. | Significant cockling appearing within 24 hours. | Do. |

It is to be understood that changes and variations may be made without departing from the spirit and scope of the invention as defined in the appended claims.

I claim:
1. A package comprising a moisture-containing food article wrapped in a transparent flexible wrapper which is resistant to cockling comprising regenerated cellulose base film, the side of said film forming the outer surface of the package having a uniform heat-sealable and moistureproof nitrocellulose coating, and the opposite side of the film which is adjacent to the food article having a uniform heat-sealable but non-moistureproof nitrocellulose coating.

2. A package as defined in claim 1 wherein the heat-sealable and moistureproof coating consists of, by weight, from about 30% to 70% nitrocellulose, from about 10% to 60% plasticizer, from about 1% to 20% blending materials and an effective amount but not more than about 10% of a moistureproofing wax, and the coating on the opposite side of said film consists of, by weight, from about 30% to 70% nitrocellulose, from about 25% to 70% plasticizer and from about 2% to 10% blending material.

3. A package as defined in claim 1 wherein the heat-sealable and moistureproof coating consists of, by weight, about 50% nitrocellulose, about 35% plasticizer, about 11% blending materials and about 4% of a moistureproofing wax, and the coating on the opposite side of said film consists of, by weight, about 53% nitrocellulose, 37% plasticizer and 10% blending material.

References Cited by the Examiner
UNITED STATES PATENTS
2,337,939  12/1943  Sermattei.
2,350,292  5/1944  Sermattei et al. __ 117—68.5 X
2,354,060  7/1944  Rhodes et al. _____ 117—68.5
2,931,732  4/1960  Hoffman et al. _____ 99—174

FOREIGN PATENTS
790,200  2/1958  Great Britain.

A. LOUIS MONACELL, *Primary Examiner.*

UNITED STATES PATENT OFFICE
CERTIFICATE OF CORRECTION

Patent No. 3,223,535　　　　　　　　　　　　　December 14, 1965

Charles M. Rosser

It is hereby certified that error appears in the above numbered patent requiring correction and that the said Letters Patent should read as corrected below.

Column 2, line 21, for "di(methylcyclohexyl)" read -- di(dimethylcyclohexyl) --.

Signed and sealed this 18th day of October 1966.

(SEAL)
Attest:

ERNEST W. SWIDER　　　　　　　　　　　　　　　EDWARD J. BRENNER
Attesting Officer　　　　　　　　　　　　　　　　Commissioner of Patents